June 17, 1958  H. D. EPSTEIN  2,839,640
THERMOSTATS
Filed April 24, 1957

Henry David Epstein,
Inventor.
Koenig and Pope,
Attorneys.

United States Patent Office 2,839,640
Patented June 17, 1958

2,839,640

THERMOSTATS

Henry David Epstein, Boston, Mass., assignor to Metals & Controls Corporation, Attleboro, Mass., a corporation of Massachusetts Application April 24, 1957, Serial No. 654,684

31 Claims. (Cl. 200—138)

This invention relates to thermostats, and more particularly to thermostatic switches.

Among the several objects of the invention may be noted the provision of improved means for mounting a thermostatic element in a thermostatic device, such as a thermostatic switch, whereby adjustment of the thermostatic element for accurate calibration of the deivce is simplified; the provision of such means in the form of a press-fitted post having permanently reliable, nonheating current-carrying characteristics; and the provision of such mounting means which is economical in respect to materials and manufacture. Other objects and features will be in part apparent and in part pointed out hereinafter.

The invention accordingly comprises the constructions hereinafter described, the scope of the invention being indicated in the following claims.

Figure 1:
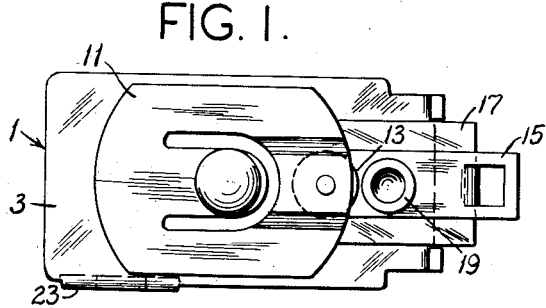
Figure 3:
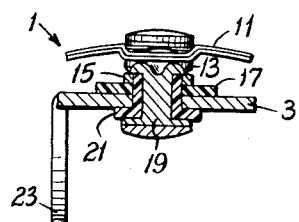
Figure 2:
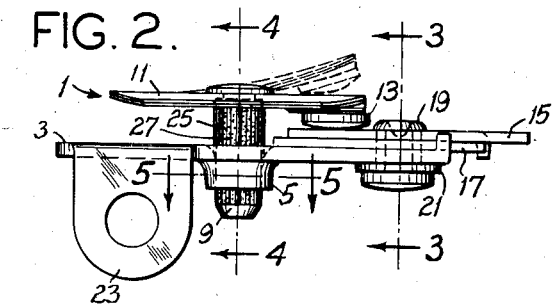
Figure 4:
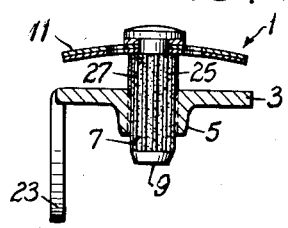
Figure 6:
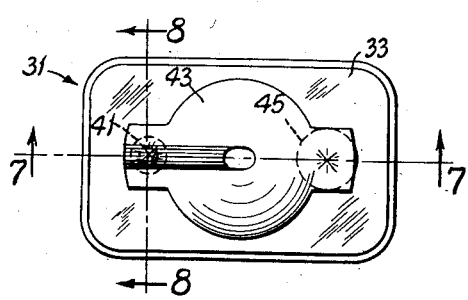
Figure 5:
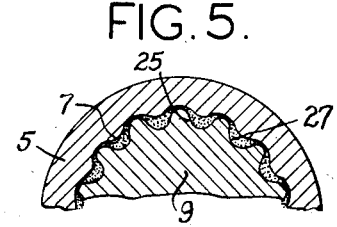
Figure 7:
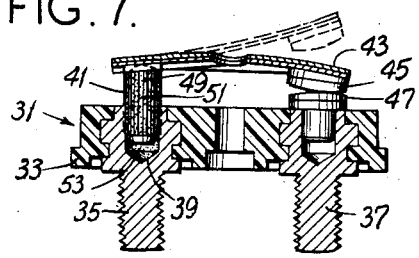
Figure 8:
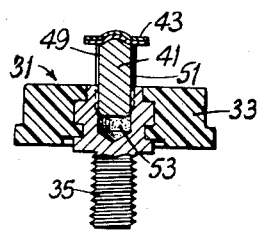

In the accompanying drawings, in which several of various possible embodiments of the invention are illustrated, Fig. 1 is a view in plan of a thermostatic switch having a snap-acting thermostatic element mounted in accordance with this invention;

Fig. 2 is a view in elevation of the switch, showing in dotted lines the open position of the snap-acting element;

Figs. 3 and 4 are vertical transverse cross sections taken on lines 3—3 and 4—4, respectively, of Fig. 2;

Fig. 5 is an enlarged horizontal cross section taken on line 5—5 of Fig. 2;

Fig. 6 is a view in plan of another thermostatic switch having a snap-acting thermostatic disk element mounted in accordance with this invention; and, Figs. 7 and 8 are vertical cross sections taken on lines 7—7 and 8—8, respectively, of Fig. 6, Fig. 7 showing in dotted lines the open position of the snap-acting disk.

Corresponding reference characters indicate corresponding parts throughout the several views of the drawings.

Referring to Figs. 1–5 of the drawings, there is shown a thermostatic switch 1 wherein this invention is employed, comprising a base 3. The base consists of a pressed-steel plate, for example. It has a tubular boss 5 providing a hole 7, which is preferably cylindrical. The hole receives a preferably cylindrical metal mounting post 9 (a steel post, for example) for a snap-acting bimetallic thermostatic element 11. The base 3, post 9 and element 11 are electrically conductive. The element 11 (which may be of the known form shown, or other suitable form) is welded to the upper end of the post. It has a contact 13 thereon which is engageable, when the element is unheated, with a metal strip 15. This strip constitutes one terminal of the switch. The strip 15 is insulated from the base 3 by a strip of insulation 17, the strips 15 and 17 being fastened to the base by means of a rivet 19. The rivet extends through an insulation bushing 21. The base has an apertured ear 23 at one side. This constitutes the other terminal of the switch.

In accordance with this invention, the post 9 preferably has its surface made rough, as by being axially grooved as indicated at 25. The grooving may be produced by a knurling operation. The roughened surface of the post is coated with a soft metal such as tin, lead, cadmium, zinc, aluminum or silver, as indicated at 27. Alternatively, or in addition, the interior surface of the tubular boss 5 is similarly coated. The properly surfaced post has a press fit in the hole 7, the ridges on the post distorting the interior surface of the tubular boss 5 in the manner shown, for example, in Fig. 5.

In manufacturing the switch, the post 9 with the element 11 therein is pressed into the hole 7 to a position wherein the contact 13 engages the terminal strip 15 with a pressure nearly approximately that required to obtain the desired operating temperature of the element 11. Then, the switch is tested to determine the operating temperature. If the operating temperature is not within tolerance, suitable adjustment is made by pushing the post in hole 7 by means of a press. The construction and mode of manufacture are such that a so-called smear weld is obtained between the post 9 and the base 3 firmly to hold the switch in calibration.

By smear weld is meant the clean, metal-to-metal contact obtained by disruption of the soft metal surfaces during the press-fitting operation. This surface disruption is sufficient that any pre-existing resistance-forming films will be broken up, so as to bring about the desired clean metal-to-metal contact and thus substantially permanent low resistance to current flow. The smearing action also distributes soft metal in a manner that it acts in a protective capacity against subsequent oxidation. In addition, it functions in somewhat of a lubricating capacity so that fine press-fit adjustments are possible. In this connection it may be mentioned that if any two clean metal surfaces are placed together and merely held in contact without smear welding, such as herein disclosed, even under high pressure the pre-existing resistance-forming films are not sufficiently disrupted and a so-called creeping type of surface oxidation may occur, which increases with time. The result is that contact resistance will develop at the joint interfaces, causing contact heating and undesirable parasitic heating of the thermostatic element 11. Both oxidation and heating increase with time. This is especially undesirable in compact constructions such as those herein described, in which parasitic heating may result in undesirable change of the operating characteristics of the device as a whole. A smear-weld type of contact minimizes this effect.

It will be understood that only the post or only the interior surface of the boss may be coated instead of both, and the advantages of the invention obtained. It is preferable, however, that both be coated. It will also be understood that the interior surface of the boss may be roughened alone, or in addition to the post roughening. However, interior roughening of the boss is not preferred because of its relatively higher cost, requiring broaching or the like.

Figs. 6–8 illustrate another type of thermostatic switch 31 wherein this invention is employed comprising a molded insulation base 33. Molded in the base are two metal terminals 35 and 37. The terminal 35 is formed with a hole or socket 39 for reception of a cylindrical metal mounting post 41 which corresponds to the post 9 above described. Welded on the upper end of the post 41 is a bimetallic snap-acting thermostatic disk 43 of the type shown in U. S. Patent 2,487,683. The disk carries a contact 45 engageable with a contact 47 mounted at the upper end of terminal 37. The post 41, like post 9, is roughened as by forming axial grooves 49. It is coated, as above described and as indicated at 51, and the surface of the terminal 35 within the hole or socket 39 is also coated as described and as indicated at 53. The post has a press fit in the hole or socket 39, and it will be understood that the calibration of the switch 31 is carried out in the same manner as that of the switch 1.

It will be understood that the roughening of the mounting post may be effected other than by axial grooving. For example, the post may be knurled with grid-type knurling.

A thermostat of the type herein described provides an adjustable post which mounts a current-supplying disk, and itself provides a permanently good electrical contact, during any calibration effected by adjusting the post. Thus, as above indicated, the post is initially pressed home to a position near, but short of that which it will assume in finally calibrated position. Then the thermostat is operated and its operating temperature determined. If this happens to be correct, the proper post-hole contact must be assured. If this is incorrect, the post is pressed slightly deeper into its containing hold and another test made and this may be continued until the proper calibration is obtained. In view of this method of calibration, it will be seen that it is important that a proper electrical contact be obtained between the post and the part into which it is press-fitted at all test positions, including its final position. Moreover, it is also important that the post shall be rigidly held in any position which may become final, as well as providing an electrical current-carrying path which will not build up resistance to current and not increasingly heat with elapse of time to cause any parasitic temperature effect on the thermostatic element.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A thermostat comprising a metal support having a hole therein, a metal post having a press fit in the hole, at least one of these parts having a relatively soft metal surface providing a smear weld between the post and the support, and a thermostatic element mounted on the post, said smear weld allowing for axial adjustment of the post in the hole by pressing for calibration purposes and acting to hold the post accurately positioned after adjustment.

2. A thermostat as set forth in claim 1 wherein said soft metal surface is constituted by a coating of soft metal on said one part different from that of the metal of said one part.

3. A thermostat as set forth in claim 1 wherein one of the parts has a roughened surface in the hole.

4. A thermostat as set forth in claim 3 wherein it is the post which is roughened.

5. A thermostat as set forth in claim 4 wherein the post is roughened by means of axial grooves.

6. A thermostat as set forth in claim 4 wherein the soft metal surface includes a coating of a soft metal on the roughened post different from the metal of the post, the latter being harder.

7. A thermostat as set forth in claim 6 wherein the soft metal comprises tin.

8. A thermostat as set forth in claim 6 wherein the soft metal comprises lead.

9. A thermostat as set forth in claim 6 wherein the soft metal comprises cadmium.

10. A thermostat as set forth in claim 6 wherein the soft metal comprises zinc.

11. A thermostat as set forth in claim 6 wherein the soft metal comprises aluminum.

12. A thermostat as set forth in claim 6 wherein the soft metal comprises silver.

13. A thermostatic switch comprising a metal support providing an electrically conductive terminal part, said terminal part having a hole therein, an electrically conductive metal post part having a press fit in the hole providing for electrical connection between the terminal part and the post part, an electrically conductive thermostatic element mounted on said post part in electrically conductive relation to the post part, a first contact on said element, and a second contact carried by the support and insulated from said terminal part and engageable by the first contact, the press fit of the post part in the hole in said terminal part allowing for adjustment of the post part by pressing to locate and hold the element in properly calibrated position, one of the said parts having a relatively soft metal surface providing a low-resistance smear weld joint between the parts, the smear weld facilitating the pressing operation and inhibiting oxidation to preserve the low resistance characteristic of the joint between said parts.

14. A thermostatic switch as set forth in claim 13 wherein said soft metal surface is constituted by a coating of soft metal on said one part different from that of the metal of said one part.

15. A thermostatic switch as set forth in claim 13 wherein one of the parts has a roughened surface in the hole.

16. A thermostatic switch as set forth in claim 15 wherein it is the post part which is roughened.

17. A thermostatic switch as set forth in claim 16 wherein the post part is roughened by means of axial grooves.

18. A thermostatic switch as set forth in claim 16 wherein the soft metal surface is constituted by a coating of a soft metal on the roughened post part different from the metal of the post part, the latter being harder.

19. A thermostatic switch comprising a metal plate part constituting an electrically conductive terminal, said plate part having a tubular boss providing a hole therein, an electrically conductive metal post part having an adjustable press fit in the hole providing for electrical connection between the plate part and the post part, an electrically conductive thermostatic element mounted on said post part in electrically conductive relation to the post part, a first contact on said element, and a second contact carried by the plate part and insulated therefrom and engageable by the first contact, the press fit of the post part in the hole in said plate part allowing for adjustment of the post part by pressing to locate and hold the element in properly calibrated position, one of the said parts having a relatively soft metal surface providing a low-resistance smear weld joint between the parts, the smear weld facilitating the pressing operation and inhibiting oxidation to preserve the low resistance characteristic of the joint between said parts.

20. A thermostatic switch as set forth in claim 19 wherein said soft metal surface is constituted by a coating of soft metal on said one part different from that of the metal of said one part.

21. A thermostatic switch as set forth in claim 19 wherein one of the parts has a roughened surface in the hole.

22. A thermostatic switch as set forth in claim 21 wherein it is the post part which is roughened.

23. A thermostatic switch as set forth in claim 22 wherein the post part is roughened by means of axial grooves.

24. A thermostatic switch as set forth in claim 22 wherein the soft metal surface is constituted by a coating of a soft metal on the roughened post different from the metal of the post, the latter being harder.

25. A thermostatic switch comprising an insulation base having a metal part constituting a first terminal mounted therein, said part having a hole, an electrically conductive metal post part having a press fit in the hole providing for electrical connection between said metal part and the post part, an electrically conductive thermostatic element mounted on said post part in electrically conductive relation to the post part, a contact on said element, and a second terminal mounted in said base and engageable by said contact, the press fit of the post part in the hole in said metal part allowing for adjustment of the post part by pressing to locate and hold the element in properly calibrated position, one of the said parts having a relatively soft metal surface providing a low-resistance smear weld joint between the parts, the smear weld facilitating the pressing operation and inhibiting oxidation to preserve the low resistance characteristic of the joint between said parts.

26. A thermostatic switch as set forth in claim 25 wherein said soft metal surface is constituted by a coating of soft metal on said one part different from that of the metal of said one part.

27. A thermostatic switch as set forth in claim 25 wherein one of the parts has a roughened surface in the hole.

28. A thermostatic switch as set forth in claim 27 wherein it is the post part which is roughened.

29. A thermostatic switch as set forth in claim 28 wherein the post part is roughened by means of axial grooves.

30. A thermostatic switch as set forth in claim 28 wherein the soft metal surface is constituted by a coating of a soft metal on the roughened post part different from the metal of the post part, the latter being harder.

31. A thermostat as set forth in claim 1 wherein the support, the post and the thermostatic element are electrically conductive, wherein the thermostatic element is mounted on the post in electrically conductive relation thereto, and wherein the smear weld is electrically conductive and electrically connects the support and post for passage of electrical current between the support and thermostatic element.

References Cited in the file of this patent

UNITED STATES PATENTS

| | | |
|---|---|---|
| 1,955,091 | Raney | Apr. 17, 1934 |
| 2,023,517 | Creager et al. | Dec. 10, 1935 |
| 2,454,295 | Verkuil | Nov. 23, 1948 |
| 2,636,099 | Brump | Apr. 21, 1953 |
| 2,671,746 | Brew | Mar. 9, 1954 |
| 2,707,216 | Farison | Apr. 26, 1955 |
| 2,737,711 | Smith | Mar. 13, 1956 |